United States Patent
Scaggs

(10) Patent No.: US 10,708,537 B2
(45) Date of Patent: Jul. 7, 2020

(54) SYSTEM AND METHOD FOR REDUCING GHOST IMAGES IN A LASER IMAGING SYSTEM

(71) Applicant: Haas Laser Technologies, Inc., Flanders, NJ (US)

(72) Inventor: Michael J. Scaggs, Weston, FL (US)

(73) Assignee: Haas Laser Technologies, Inc., Flanders, NJ (US)

( * ) Notice: Subject to any disclaimer, the term of this patent is extended or adjusted under 35 U.S.C. 154(b) by 95 days.

(21) Appl. No.: 16/048,226

(22) Filed: Jul. 28, 2018

(65) Prior Publication Data
US 2020/0036936 A1 Jan. 30, 2020

(51) Int. Cl.
| | |
|---|---|
| *H04N 5/72* | (2006.01) |
| *H04N 5/335* | (2011.01) |
| *G02B 5/20* | (2006.01) |
| *G02B 7/00* | (2006.01) |
| *G02B 27/00* | (2006.01) |

(52) U.S. Cl.
CPC .............. *H04N 5/72* (2013.01); *G02B 5/205* (2013.01); *G02B 7/006* (2013.01); *G02B 27/0018* (2013.01); *H04N 5/335* (2013.01)

(58) Field of Classification Search
CPC .......... H04N 5/72; H04N 5/335; G02B 5/505; G02B 7/006; G02B 27/0018
See application file for complete search history.

(56) References Cited

U.S. PATENT DOCUMENTS

| | | |
|---|---|---|
| 4,384,198 A | 5/1983 | Williamson |
| 5,064,284 A | 11/1991 | Johnston, Jr. et al. |
| 5,069,527 A | 12/1991 | Johnston, Jr. et al. |
| 5,078,491 A | 1/1992 | Johnston, Jr. |
| 5,100,231 A | 3/1992 | Sasnett et al. |

(Continued)

FOREIGN PATENT DOCUMENTS

| | | |
|---|---|---|
| JP | S5979122 A | 5/1984 |
| JP | H09-38790 A | 2/1997 |

(Continued)

OTHER PUBLICATIONS

International Search Report and Written Opinion for PCT/US2011/031776 (filing date: Apr. 8, 2011) dated Jan. 2, 2012; Applicant: Michael J. Scaggs.

(Continued)

*Primary Examiner* — Amy R Hsu
(74) *Attorney, Agent, or Firm* — Molly L. Sauter; Smith & Hopen, P.A.

(57) ABSTRACT

A method and apparatus for reducing ghost images in a laser imaging system. The method includes, positioning an absorptive neutral density filter, having an optical density (OD) of at least −1, between a pixelated detector and a laser source. The method further includes, emitting a laser beam, from the laser source onto the absorptive neutral density filter, transmitting a portion of the light incident upon a first surface of the absorptive neutral density filter to a second surface of the absorptive neutral density filter, reflecting a portion of light incident upon the second surface of the absorptive neutral density filter and absorbing the reflected portion of light, by the absorptive neutral density filter, to reduce ghost images at the pixelated detector.

23 Claims, 11 Drawing Sheets

(56) References Cited

U.S. PATENT DOCUMENTS

| | | | |
|---|---|---|---|
| 5,214,485 | A | 5/1993 | Sasnett et al. |
| 5,267,012 | A | 11/1993 | Sasnett et al. |
| 5,329,350 | A | 7/1994 | Wright et al. |
| 5,459,565 | A | 10/1995 | Aharon |
| 5,521,759 | A | 5/1996 | Dobrowolski et al. |
| 6,028,671 | A | 2/2000 | Svetkoff et al. |
| 6,313,910 | B1 | 11/2001 | Garvey et al. |
| 6,497,490 | B1 | 12/2002 | Miller et al. |
| 6,596,982 | B1 | 7/2003 | Skokan et al. |
| 7,957,449 | B2 | 6/2011 | Wakabayashi et al. |
| 8,237,922 | B2 | 8/2012 | Scaggs |
| 9,513,417 | B2 | 12/2016 | Uchiyama et al. |
| 9,588,266 | B2 * | 3/2017 | Uchiyama .............. G02B 1/115 |
| 2002/0021728 | A1 | 2/2002 | Newman et al. |
| 2002/0186474 | A1 * | 12/2002 | Weber ...................... G02B 5/22 |
| | | | 359/580 |
| 2005/0220163 | A1 | 10/2005 | Okuta et al. |
| 2007/0297483 | A1 * | 12/2007 | Wakabayashi ...... G03F 7/70025 |
| | | | 372/97 |
| 2008/0165320 | A1 * | 7/2008 | Heiberger .............. A61B 3/103 |
| | | | 351/206 |
| 2011/0051251 | A1 * | 3/2011 | Endoh ................ G02B 27/0018 |
| | | | 359/614 |
| 2013/0155212 | A1 * | 6/2013 | Kamo .................. G02B 23/243 |
| | | | 348/65 |
| 2015/0062409 | A1 * | 3/2015 | Tsuzuki ................. G02B 7/102 |
| | | | 348/342 |
| 2015/0323705 | A1 * | 11/2015 | Hart .................... C03C 17/3435 |
| | | | 359/580 |
| 2016/0291223 | A1 | 10/2016 | Rudigier-Voigt et al. |
| 2016/0349539 | A1 * | 12/2016 | Waisman ............... G02C 11/10 |
| 2017/0285308 | A1 * | 10/2017 | Georgiev ........... G02B 13/0085 |
| 2018/0007275 | A1 * | 1/2018 | Masuda .................. G01S 7/497 |
| 2018/0316873 | A1 * | 11/2018 | Wei ....................... G01S 17/931 |

FOREIGN PATENT DOCUMENTS

| | | |
|---|---|---|
| JP | H11-8427 A | 1/1999 |
| JP | 2002-176007 A | 6/2002 |
| JP | 2005-101202 A | 4/2005 |
| JP | 2005-236327 A | 9/2005 |
| JP | 2008-122202 A | 5/2008 |
| JP | 2008-292404 A | 12/2008 |

OTHER PUBLICATIONS

International Preliminary Report on Patentability for PCT/US2011/031776 (filing date: Apr. 8, 2011) with a priority date of Apr. 8, 2010; Applicant: Haas Laser Technologies, Inc. et al.
First Chinese Office Action for Chinese Application: 201180028392.7 dated Apr. 21, 2014; Applicant: Haas Laser Technologies, Inc. et al.
Translation of First Chinese Office Action for Chinese Application: 201180028392.7 dated Apr. 21, 2014; Applicant: Haas Laser Technologies, Inc. et al.
Second Chinese Office Action for Chinese Application: 201180028392.7 dated Oct. 10, 2014; Applicant: Haas Laser Technologies Inc. et al.
Translation of Second Chinese Office Action for Chinese Application: 201180028392.7 dated Oct. 10, 2014; Applicant: Haas Laser Technologies, Inc. et al.
Third Chinese Office Action for Chinese Application: 201180028392.7 dated Apr. 10, 2015; Applicant: Haas Laser Technologies, Inc. et al.
Translation of Third Chinese Office Action for Chinese Application: 201180028392.7 dated Apr. 10, 2015; Applicant: Haas Laser Technologies, Inc. et al.
Scaggs and Haas. Real time laser beam analysis system for high power lasers. Proc. of SPIE. 2011. vol. 7913: 791306-1-791306-9.
European Patent Office Form 1507S (Supplementary Search Report) for European Application No. 11766817.8 with a notification date of Nov. 8, 2017; Applicant: Haas Laser Technologies, Inc.
European Patent Office Form 2001 (Communication pursuant to Article 94(3) EPC) for European Application No. 11766817.8 with a notification date of Jul. 9, 2018; Applicant: Haas Laser Technologies, Inc.
Japanese Notification of Reason(s) for Refusal for Japanese Application: 2013-503987 with a dispatch date of Sep. 3, 2014; Applicant: Haas Laser Technologies, Inc.
Translation of Japanese Notification of Reason(s) for Refusal for Japanese Application: 2013-503987 with a dispatch date of Sep. 3, 2014; Applicant: Haas Laser Technologies, Inc.
Indian First Examination Report for Indian Application 9267/CHENP/2012 with a dispatch date of Dec. 3, 2018; Applicant: Haas Laser Technologies, Inc.
Translation of Japanese Patent Application JP2002176007A with a publication date of Jun. 21, 2002.
Translation of Japanese Patent Application JP2005101202A with a publication date of Apr. 14, 2005.
Translation of Japanese Patent Application JP2005236327A with a publication date of Sep. 2, 2005.
Translation of Japanese Patent Application JP2008122202A with a publication date of May 29, 2008.
Translation of Japanese Patent Application JP2008292404A with a publication date of Dec. 4, 2008.
Translation of Japanese Patent Application JPH118427A with a publication date of Jan. 12, 1999.
Translation of Japanese Patent Application JPH0938790A with a publication date of Feb. 10, 1997.
Translation of Japanese Patent Application JPS5979122A with a publication date of May 8, 1984.
CCD Camera Beam Profiler, Thorlabs, https://www.thorlabs.com/newgrouppage9.cfm?objectgroup_id=3483, last accessed Jan. 28, 2020.
NG9 Data Sheet, Schott, 2013, retrieved from https://shop.schott.com/advanced_optics/Products/Optical-Filter-Glass/Matt-Filter-Plates/Neutral-density/NG9/c/matt-plate/glass-NG9, last accessed Jan. 28, 2020.
Unmounted Absorptive Neutral Density Filters, Thorlabs, https://www.thorlabs.com/newgrouppage9.cfm?objectgroup_id=5011, last accessed Jan. 28, 2020.
Unmounted UV Fused Silica Reflective ND Filters, Thorlabs, https://www.thorlabs.com/newgrouppage9.cfm?objectgroup_id=6106, last accessed Jan. 28, 2020.

* cited by examiner

SYSTEM AND METHOD FOR REDUCING GHOST IMAGES IN A LASER IMAGING SYSTEM

BACKGROUND OF THE INVENTION

Laser imaging systems are known in the art for analyzing laser beams and for observing a laser interaction area in material processing.

Ghost images at an image plane in a laser imaging system, such as on a pixelated detector of a Charged Coupled Device (CCD) or Complementary Metal-Oxide-Semiconductor (CMOS) digital camera, or other digital imaging system, are caused by reflections of light from the optical media of the imaging system, wherein the optical media have non-zero reflection and transmission coefficients. The non-zero reflection and transmission of light is a result of the difference in the refractive index on either side of the interface. At the interface, a portion of the incident light from a laser beam is transmitted at the surface of the optical media, while another portion of the incident light is reflected. The reflected light then propagates back to another optical media surface, which is reflected again and eventually propagates to the image plane, resulting in the pixelated detector sensing a ghost image. The ghost image is undesirable because it negatively affects the ability of the pixelated detector to accurately measure the laser beam or distort an image.

While anti-reflection coatings for the optical media are known in the art for reducing the ghost images, the known anti-reflection coatings are not effective in mitigating the ghost reflections in applications utilizing pixelated detectors that are extremely sensitive to the ghost images or when the wavelength band is broader then about 25 nm to 50 nm.

Accordingly, there is a need in the art for an apparatus and method for reducing the ghost images seen by a detector of a laser imaging system.

However, in view of the art considered as a whole at the time the present invention was made, it was not obvious to those of ordinary skill in the art how the limitations of the art could be overcome.

SUMMARY OF THE INVENTION

The present invention provides a method and apparatus for reducing ghost images in a laser imaging system.

In one embodiment, a method for reducing ghost images in a laser imaging system, includes, positioning an absorptive neutral density filter between a pixelated detector and a laser source, wherein the absorptive neutral density filter has a first surface facing the laser source and a second surface facing the pixelated detector and wherein the second surface is an anti-reflective surface. The method further includes, emitting a laser beam, from the laser source, onto the first surface of the absorptive neutral density filter, transmitting a portion of the light incident upon the first surface of the absorptive neutral density filter to the second surface of the absorptive neutral density filter, reflecting a portion of light incident upon the second surface of the absorptive neutral density filter and absorbing the reflected portion of light, by the absorptive neutral density filter, to reduce ghost images at the pixelated detector.

In one embodiment the optical density (OD) of the absorptive neutral density filter may be at least −1. In another embodiment, the OD of the absorptive neutral density filter may be about −0.5, thereby providing a signal-to-noise ration (SR) comparable to that of known anti-reflective coatings.

In a particular embodiment, the absorptive neutral density filter may be an absorbing glass. In an additional embodiment, the first surface of the absorptive neutral density filter may be a highly reflective surface and the second surface of the absorptive neutral density filter may have an anti-reflective surface. In one embodiment, the second surface of the absorptive neutral density filter may comprise an anti-reflective coating.

In a specific embodiment, the first surface of the absorptive neutral density filter may be greater than about 99% reflective and the second surface of the absorptive neutral density filter may be less than about ~0.5% reflective.

The method may further include, prior to positioning an absorptive neutral density filter between a pixelated detector and a laser source, positioning the absorptive neutral density filter in optical contact with an optical element. The optical contact may be accomplished by bonding the absorptive neutral density filter to the optical element using a bonding agent having an index of refraction substantially equal to the index of refraction of the absorptive neutral density filter and the optical element. Alternatively, the optical contact may be accomplished by establishing atomic bonding between the absorptive neutral density filter to the optical element.

In a particular embodiment, the optical element may be a protective glass window of the pixelated detector and the protective glass window may be positioned in optical contact with the second surface of the absorptive neutral density filter. In another embodiment, the optical element may be a mirror that reflects the laser beam but transmits visible light to the absorptive neutral density filter and the mirror may be positioned in optical contact with the first surface of the absorptive neutral density filter.

The present invention additionally provides an apparatus for reducing ghost images in a laser imaging system that includes, a laser source to emit a laser beam, a pixelated detector to analyze the laser beam emitted from the laser source and an absorptive neutral density filter positioned between the pixelated detector and the laser source. In this embodiment, the absorptive neutral density filter has a first surface facing the laser source and a second surface facing the pixelated detector. In operation, the absorptive neutral density filter receives a laser beam emitted from the laser source, transmits a portion of light incident upon the first surface of the absorptive neutral density filter to the second surface of the absorptive neutral density filter, reflects a portion of light incident upon the second surface of the absorptive neutral density filter and absorbs the reflected portion of light to reduce ghost images at the pixelated detector.

The pixelated detector may include a pixelated detector for analyzing the laser beam and the laser beam emitted from the laser source may be both longitudinally and spatially coherent.

In another embodiment, an apparatus in accordance with the present invention for reducing ghost images in a laser imaging system includes, a laser source to emit a laser beam, a pixelated detector to analyze the laser beam emitted from the laser source, an optical element and an absorptive neutral density filter in optical contact with the optical element. In this embodiment, the absorptive neutral density filter and the optical element are positioned between the pixelated detector and the laser source, the absorptive neutral density filter has a first surface facing the laser source and a second surface facing the pixelated detector. In operation of this embodiment, the absorptive neutral density filter receives a laser beam emitted from the laser source, transmits a portion of light incident upon the first surface of the absorptive neutral density filter to the second surface of the absorptive neutral density filter, reflects a portion of light incident upon the second surface of the absorptive neutral density filter and absorbs the reflected portion of light to reduce ghost images at the pixelated detector. In one embodiment, the optical element may be a mirror that reflects the laser beam but transmits visible light to the absorptive neutral density filter and be positioned in optical contact with the first surface of the absorptive neutral density filter. In another embodiment, the optical element may be a protective window for the pixelated detector and the optical element may be in optical contact with the second surface of the absorptive neutral density filter.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
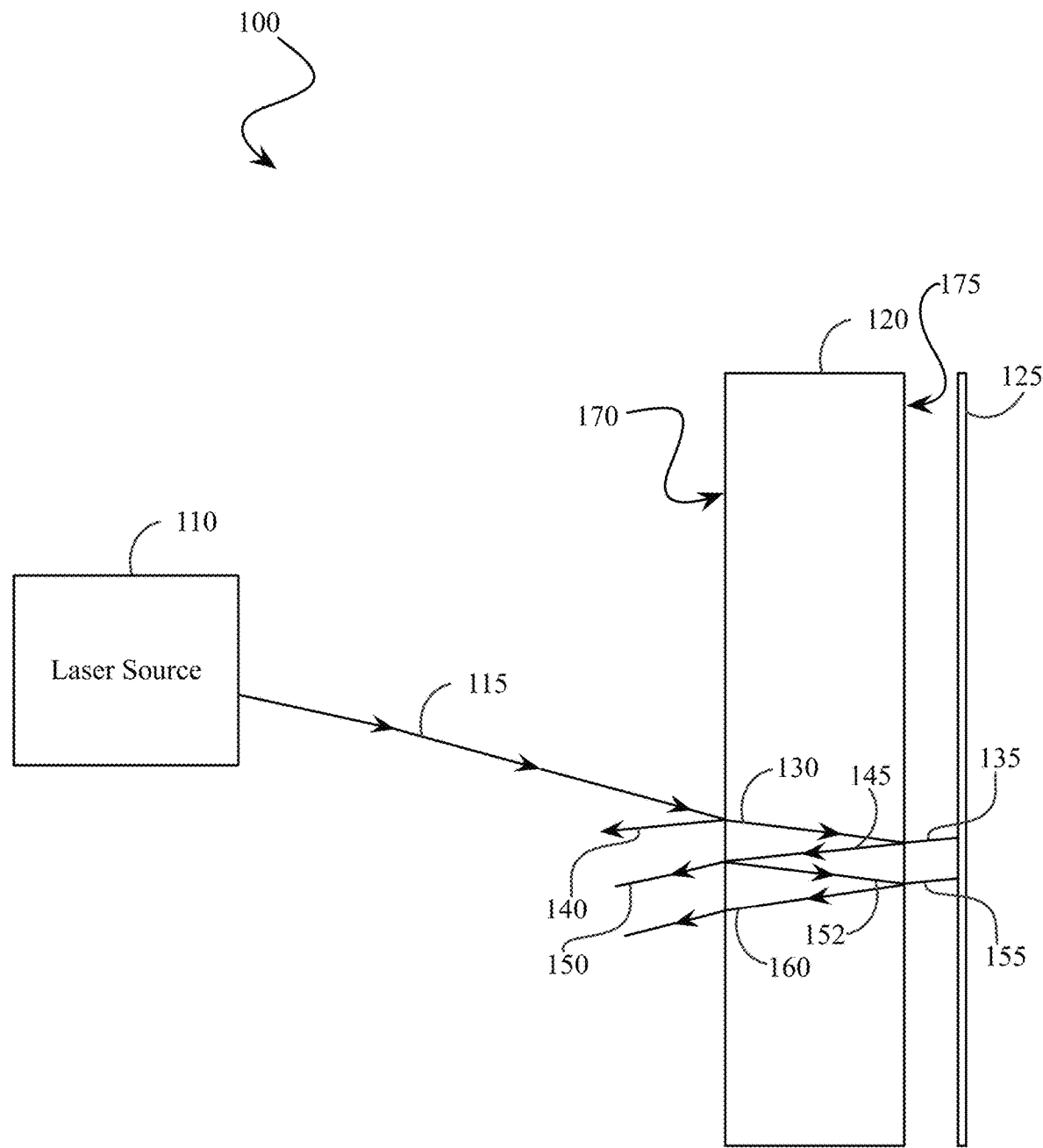
FIG. 1 is a diagram illustrating a laser imaging system having a protective glass window and associated ghost image at a pixelated detector, as is known in the prior art.

In various embodiments, the present invention provides a method and apparatus for reducing ghost images in a laser imaging system. The method includes, positioning an absorptive neutral density filter, having an optical density (OD) of at least −1, between a pixelated detector and a laser source. The method further includes, emitting a laser beam, from the laser source onto the absorptive neutral density filter, transmitting a portion of the light incident upon a first surface of the absorptive neutral density filter to a second surface of the absorptive neutral density filter, reflecting a portion of light incident upon the second surface of the absorptive neutral density filter and absorbing the reflected portion of light, by the absorptive neutral density filter, to reduce ghost images at the pixelated detector.

Fresnel reflections in optics are a proportional reflection of incident light at a discrete interface between two optical media, wherein the two optical media have dissimilar indices of refraction, such as air and glass. A common Fresnel reflection, for predominately normal angle of incidence (<10 degrees), that occurs at an air-glass interface results in a proportional reflection loss of about 4%, due to the difference between the index of refraction of air and the index of refraction of glass. This reflection loss can be reduced by layering optical media between the glass and air interface to gradually reduce the index of refraction differential between the intermediate layers, thereby reducing the reflection loss to levels well below 0.5%, but generally not below 0.1%, except for very high-quality single "V" type coatings. Fresnel reflections are based upon the following equation:

$$R = \frac{(n_1 - n_2)^2}{(n_1 + n_2)^2}$$

Where, R is the percent reflection between the first optical media, having an index of refraction of $n_1$, and the second optical media, having an index of refraction of $n_2$. In an exemplary embodiment, if the first optical media is air, having an index of refraction equal to 1.00029 ($n_1$), and the second optical media is glass, having an index of refraction equal to 1.5 ($n_2$), then the percentage of light reflected from the air-glass interface will be about 4%. As there are finite glass materials available to mitigate the Fresnel reflection, it follows that one cannot achieve near zero reflection losses between an air and glass interface.

The transmitted power for a predominately normal incident laser beam between two optical media would be determined by:

$$T = \frac{4n_1 n_2}{[n_1 + n_2]^2}$$

As the angle of incidence increases, the influence of polarization begins to impact the amount of reflected and transmitted light by the following equations:

$$t_s = \frac{2n_1 \cos\theta_1}{n_1 \cos\theta_1 + n_2 \cos\theta_2}$$

-continued $$r_s = \frac{n_1\cos\theta_1 - n_2\cos\theta_2}{n_1\cos\theta_1 + n_2\cos\theta_2}$$

$$t_p = \frac{2n_1\cos\theta_1}{n_1\cos\theta_2 + n_2\cos\theta_1}$$

$$r_p = \frac{n_1\cos\theta_2 - n_2\cos\theta_1}{n_1\cos\theta_2 + n_2\cos\theta_1}$$

Where $t_s$ and $r_s$ are the transmitted and reflected light values for the "S" polarized component and $t_p$ and $r_p$ are the transmitted and reflected light values for the "P" polarized component.

In order to reduce reflection losses at air-glass interfaces, an antireflection coating is commonly used to prevent secondary reflections, or "ghost" reflections, that may obstruct the viewing of an object of interest by a human eye or a camera. While antireflection coatings are effective in reducing ghost reflections in these scenarios, many imaging systems exist that are much more sensitive to ghost reflections than the human eye, such as Charged Coupled Device (CCD), Complementary Metal-Oxide-Semiconductor (CMOS), InGaAs (Indium Gallium Arsenide) for the SWIR light band, InSb (Indium Antionide) for the MWIR light band and microbolometers for the LWIR light band digital cameras and digital imaging systems. CCD and CMOS digital imaging systems commonly include a pixelated detector, which comprises an array of light-sensing pixels to convert incoming photons into electronic charges at the semiconductor-oxide interface of the detector. Fresnel reflections occurring in these highly sensitive imaging systems can obscure an image or negatively impact a measurement taken by the imaging system in which they are employed.

Additionally, imaging systems utilizing pixelated detectors are commonly made from semiconductor materials using lithography-based circuitry manufacturing. The resulting circuitry from this manufacturing process is extremely delicate and easily damaged. Such pixelated detector-based imaging systems typically include a protective glass window to protect the fragile circuitry from damage. However, the use of a protective glass window introduces an air-glass interface between the protective glass window and the detector. As previously discussed, the air-glass interface introduced into the imaging system by the protective glass window results in undesirable Fresnel reflections, which are referred to here as ghost reflections.

In some imaging systems, the protective glass window used to protect the delicate circuitry may be an uncoated glass substrate in the visible portion of the optical spectrum. In other imaging systems, such as Short-Wave Infrared (SWIR), Mid-Wave Infrared (MWIR) and Long-Wave infrared (LWIR) detectors, a protective glass window appropriate for the wavelength band on interest may be used. In the case of CCD and CMOS sensors, where the wavelength band may be from the Ultra Violet (UV) to the Near Infrared (NIR) (from 190 nm to more than 1100 nm), a UV grade fused silica protective glass window may be employed in the imaging system. Considering the very broad range of wavelengths that are possible in CCD and CMOS based imaging systems, it is extremely difficult to apply an interface coating on the protective glass window that would be effective in reducing the Fresnel reflections over this broad wavelength range. As such, most sensors used over this band have their protective window removed to avoid the Fresnel reflection losses and associated ghost reflections that can obscure the sensors measurement ability.

With reference to FIG. 1, a prior art imaging system 100 may include a laser source 110, a protective glass window 120 and a pixelated detector 125. In the prior art, the protective glass window 120 is positioned between the laser source 110 and the sensor material of the pixelated detector 125 to protect the sensing circuitry of the pixelated detector 125.

In operation of the prior art imaging system 100, a laser beam 115 emitted from the laser source 110 passes through the air and strikes the first surface 170 of the protective glass window 120. A first Fresnel reflection occurs at this air-glass interface, wherein a first transmitted portion 130 of the light from the laser beam is transmitted through the protective glass window 120, and a first reflected portion 140 of the light is reflected. The transmitted portion 130 then strikes the second surface 175 of the protective glass window 120 and a second Fresnel reflection occurs at this glass-air interface, wherein a second transmitted portion 135 of the light is transmitted through the air, striking the pixelated detector 125, and a second reflected portion 145 of the light is reflected. This second reflected portion of light 145 strikes the first surface 170 again, resulting in a third transmitted portion 150 of light that enters the air and a third reflected portion 152 of light that is transmitted back through the protective glass window 120. This third reflected portion 152 of light experiences another Fresnel reflection at the air interface between the protective glass window 120 and the pixelated detector 125, resulting in a forth transmitted portion 155 of light striking the pixelated detector 125 and a forth reflected portion 160 of light being reflected through the protective glass window 120. The forth transmitted portion 155 of light striking the pixelated detector 120 results in a ghost image at the pixelated detector 125. In general, as illustrated in FIG. 1, each optical medium interface that the incident laser beam 115 crosses causes some portion of the incident light to be reflected, thereby creating a ghost image of the incident beam on the pixelated detector. The ghost image of the incident laser beam 115 is undesirable because, a typical laser beam can be both highly longitudinally and spatially coherent, the Fresnel reflection and associated ghost image causes destructive and constructive interference fringes. The resulting spatial modulation on the beam would be noise, which would obscure the true spatial profile of the laser beam.

Figure 2:
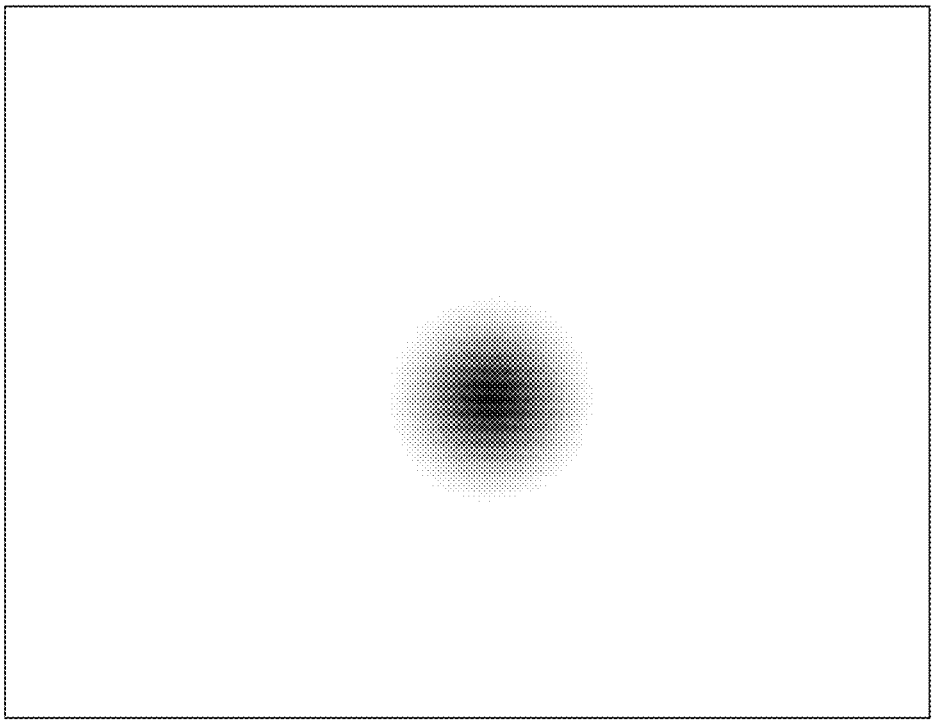
FIG. 2 is an illustration of the resulting interference fringes from ghost images resulting from Fresnel reflections with coherent laser light on a pixelated detector, as is known in the prior art.

FIG. 2 illustrates a gray scale 3D intensity of a ghost image resulting from a coherent laser beam having a nominal 1 mm beam diameter and a wavelength of 532 nm that is detected by a pixelated detector (2048×1088 pixels) having a protective glass window. As can be seen, while the reflected light of the laser beam is only about 4% of the emitted laser beam, the constructive and destructive interference resulting from the ghost image is quite pronounced and would severely impact the ability of the pixelated detector to make accurate laser beam measurements.

In various embodiments, the present invention provides a system and method for mitigating ghost reflections due to Fresnel reflection losses in imaging systems utilizing pixelated detectors, such as, but not limited, to CCD, CMOS, InGaAs, InSb and microbolometer sensors.

In one embodiment, the present invention provides an improved protective window for a pixelated detector of an imaging system that does not introduce the adverse effects of Fresnel reflections and ghost reflections. The improved protective window provides protection for the sensitive circuitry of the laser imaging system without introducing ghost reflections into the measurement of the laser.

Figure 3:
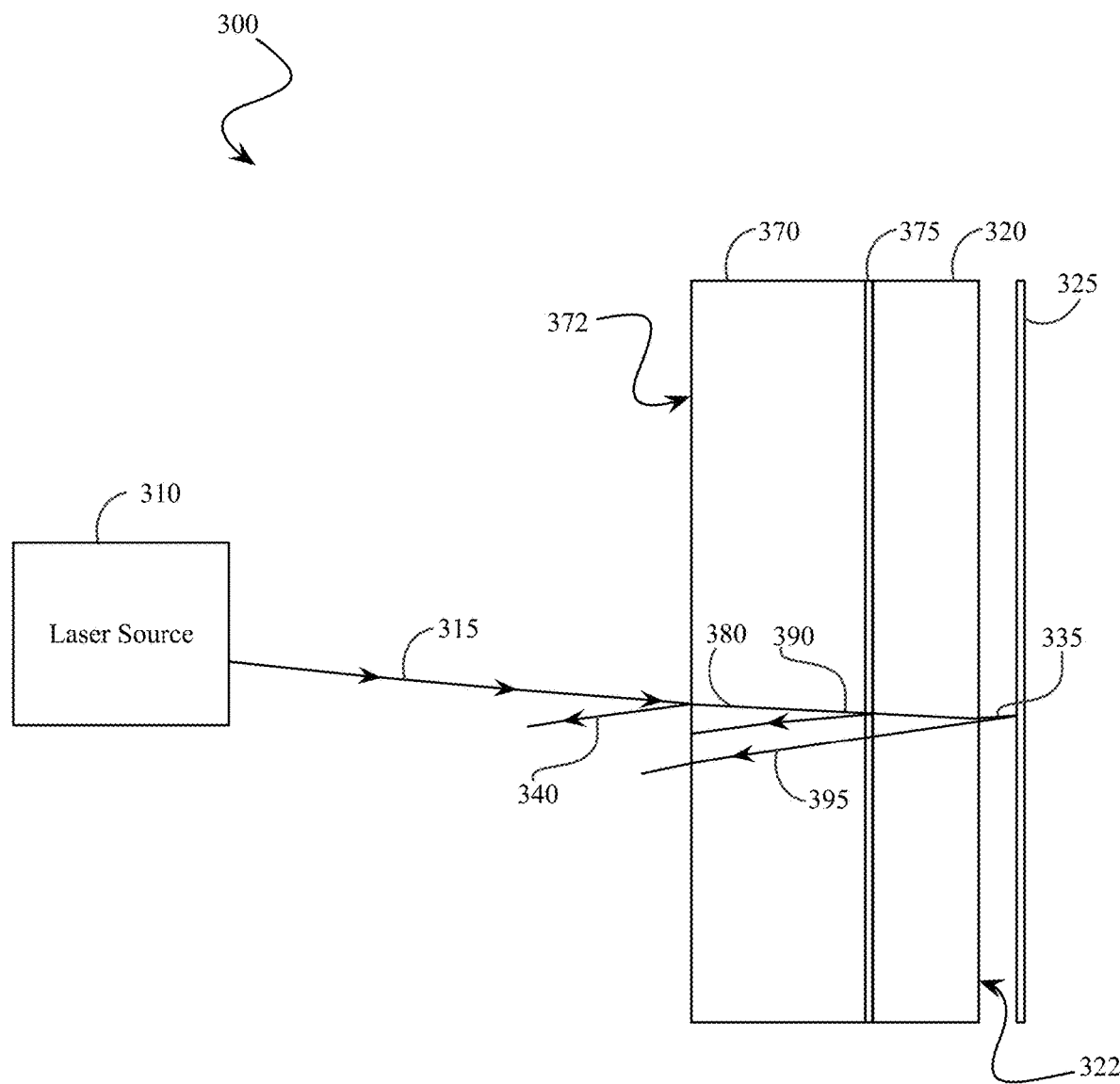
FIG. 3 illustrates a laser imaging system incorporating an absorptive neutral density filter optically connected to the protective glass window to reduce ghost images, in accordance with an embodiment of the present invention.

With reference to FIG. 3, in one embodiment, an imaging system of the present invention 300 may include a laser source 310, a protective glass window 320, a pixelated detector 325 and an absorptive neutral density filter 370 optically connected to the protective glass window 320.

The laser source 310 may be one of numerous laser sources known in the art. Commercially available lasers having powers from nanowatts to multikilowatts are within the scope of the present invention. In a particular embodiment, the laser source 310 is capable of emitting a laser beam that can be both longitudinally and spatially coherent.

The protective glass window 320 may be an uncoated glass substrate for the visible portion of the optical spectrum. Alternatively, the protective glass window may be a coated glass window appropriate for the wavelength band related to the laser source 310. The surface of the protective glass window facing the pixelated detector 325 includes an anti-reflective coating 322. The protective glass window 320 is generally positioned to protect the delicate circuitry of the pixelated detector 325 from physical damage.

The pixelated detector 325 may be one of many pixelated detectors known in the art, including but not limited, to Charge-Coupled Device (CCD) and Complementary Metal Oxide Semiconductor (CMOS) or other pixilated detector. The pixelated detector 325 is configured to analyze the laser beam emitted from the laser source 310. The analysis may include various measurements, such as, but not limited to, the spatial profile, centroid, and ellipticity of the laser beam.

The absorptive neutral density filter 370 of the present invention attenuates incident radiation uniformly independent of wavelength, i.e. neutral with respect to wavelength. The absorptive neutral density filter 370 is characterized by the percent of incident light transmitted or by its optical density (OD). If 10% of light is transmitted (T=0.1), the filter is said to have an OD equal to −1. At T=0.01, the filter is said to have an OD equal to −2 and at T=0.001 the filter is said to have an OD equal to −3. In general, OD=−log 10(T).

The absorptive neutral density filter 370 may be fabricated from various absorptive glass substrates known in the art. For example, the absorptive neutral density filter 370 may be fabricated from one of a variety of Schott® NG-rated glass or Hoya® ND-rated glass, or any other glass having an almost constant attenuation inside the visible spectrum. It would be obvious to those skilled in the art that any "absorbing" glass with an OD~−1.0 is within the scope of the present invention.

In this embodiment of the present invention, the absorptive neutral density filter 370 includes a first surface 372 facing the laser source 310 and a second surface 374 facing the pixelated detector 325. Additionally, the second surface 374 of the absorptive neutral density filter 370 is in optical contact with the protective glass window 320. In this embodiment, a first surface of the protective glass window 320 is in optical contact with the second surface 374 of the absorptive neutral density filter 370 and a second surface of the protective glass window 320 includes an anti-reflective coating 322. The protective glass window 320 is positioned in close proximity to the pixelated detector 325. In a particular embodiment, the protective glass window 320 is positioned to be less than about 5 mm from the pixelated detector 325.

In one embodiment, the protective glass window 320 in positioned in optical contact with the second surface 374 of the absorptive neutral density filter 370 by bonding a surface of the protective glass window 320 to the second surface 374 of the absorptive neutral density filter 370 using optical glue or adhesive having a refractive index that substantially matches the refractive index of the absorptive neutral density filter 370 and the protective glass window 320. A wide variety of adhesives 375 may be used for optical bonding, including well known optical adhesives from Norland Products®, silicone, optical epoxy, and polyurethane. One of the objectives of optical bonding is to remove the air gap between the absorptive neutral density filter 370 and the protective glass windows 320, using the optical-grade adhesive 175. In general, the difference between the refractive index of the bonding material and the refractive index of both the absorptive neutral density filter 370 and the protective glass window 320 the should be less than about 20%.

In an additional embodiment, the optical contact between the absorptive neutral density filter 370 and the protective glass window 320 may be accomplished through atomic bonding. Atomic bonding is a glueless process whereby two closely conformal surfaces are held together purely by intermolecular forces. To accomplish atomic bonding, the absorptive neutral density filter 370 and the protective glass window 320 would need to be very well polished and be exposed to minimal thermal cycling.

In one exemplary embodiment of FIG. 3, the absorptive neutral density filter 370 may be made from Schott® NG4 glass material of a nominal thickness of 1.9 mm and an index of refraction of about 1.51 at a laser beam wavelength of about 532 nm. The protective glass window 320 may be a 1 mm thick protective glass cover of a pixelated detector 325 having an index of refraction of about 1.52 at a laser beam wavelength of about 532 nm. The absorptive neutral density filter 370 may be optically attached to the protective glass window 320 by an index matching glue having a nominal index of refraction equal to about 1.56, such as Norland Products® NOA 61.

In operation of the laser imaging system 300 of FIG. 3, a laser beam 315 from the laser source 310 strikes the first surface 372 of the absorptive neutral density filter 370. Assuming the absorptive neutral density filter has an OD equal to about −1, in the visible band, the absorptive neutral density filter 370 attenuates the light from the laser beam 315 by about 90%. A portion of the light 340 from the laser beam 315 is also lost due to a Fresnel reflection at the air-glass interface between the laser source 310 and the absorptive neutral density filter 370. As such, about 10% of the light 380 is transmitted through the absorptive neutral density filter 370 and the protective glass window 320. The transmitted light 380 exits the protective glass window 320 and experiences a Fresnel reflection at the air-glass interface between the protective glass window 320 and the pixelated detector 325. The interface between the absorptive neutral density filter 370 and the optical bond 375 results in a small reflection of light 390. This reflected light 390 is a small value and becomes inconsequential due to the low reflection and the return reflection 390 is essentially fully absorbed by the neutral density filter 370 beyond the detection limits of the pixelated detector 325. The light 395 reflected by the air-glass interface between the protective glass window 320 and the pixelated detector 325 is reflected back through the protective glass window 320 and the absorptive neutral density filter 370. The reflected light 395 is then absorbed by the absorptive neutral density filter 370 and its impact on interference is mitigated beyond detection by the pixelated detector. Additionally, the anti-reflective coating on the second surface of the protective glass window 320 overcomes the destructive and constructive interference that occurs from the Fresnel reflections at the air-glass interface between the protective glass window 320 and the pixelated detector 325. While in the prior art, this reflected light 390 would result in a ghost image at the pixelated detector 325, in the present invention the absorptive neutral density filter 370 is effective in absorbing the reflected light 390 from the Fresnel reflection at the air-glass interface between the protective glass window 320 and the pixelated detector 325, thereby reducing the presence of the ghost image at the pixelated detector 325.

While only about 10% of the light from the laser beam 315, minus the approximately 4% Fresnel reflection 340, is transmitted as light 335 to the pixelated detector 325, most laser beams used in laser imaging systems need to be heavily attenuated before they can illuminate the sensor of the pixelated detector 325. Due to the substantial number of photons available from the laser beam 315 and the wide dynamic range of the sensor of the pixelated detector 325, the lost light is inconsequential to the operating of the laser imaging system 300.

In the present invention, while the ghost reflection 390 still exists, as a result of the Fresnel reflection at the air-glass interface between the protective glass window 320 and the pixelated detector 325, it is reflected back through the protective glass window 320 and the absorptive neutral density filter 370, thereby further attenuating the reflected light by another factor of 10. As such, the ghost Fresnel reflection is no less than $\frac{1}{100}^{th}$ of the light 335 incident upon the pixelated detector 325, which is far better than any anti-reflection coatings known in the art.

Additionally, it would be obvious to those skilled in the art that utilizing an even more absorptive glass in the absorptive neutral density filter 370 would further reduce the Fresnel reflections and associated ghost image of the laser imaging system 300. In general, any absorptive glass that provides an OD≤−1 for the wavelength being used is within the scope of the present invention.

Figure 4:
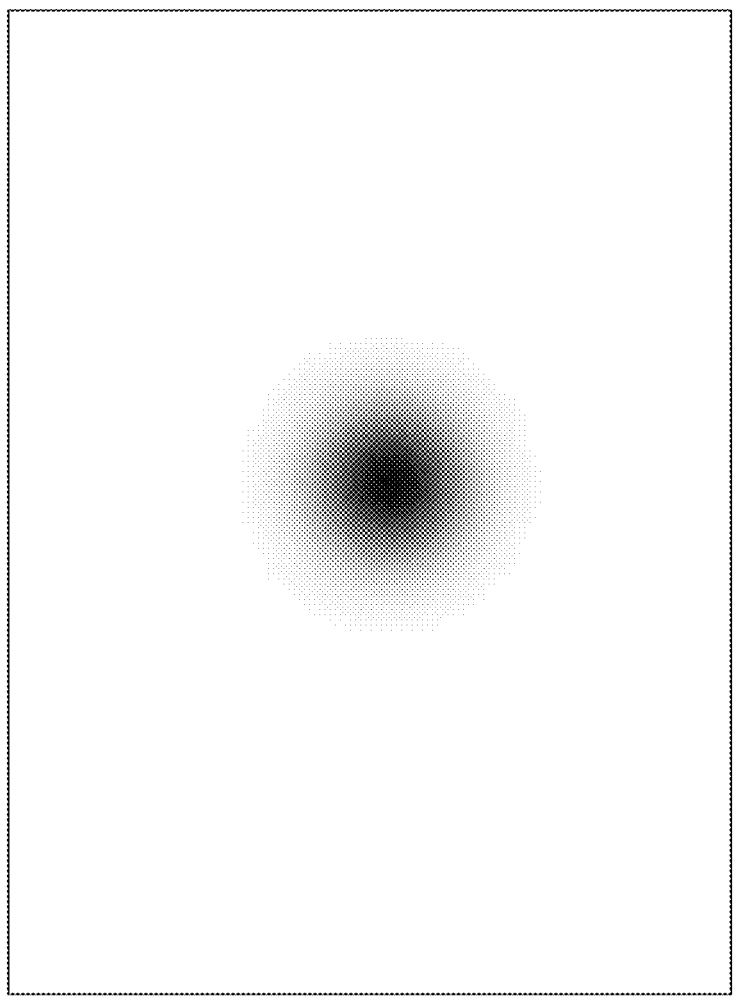
FIG. 4 illustrates the mitigated fringing effect realized by utilizing the improved laser imaging system of FIG. 3.

FIG. 4 illustrates the results when the laser imaging system 300 includes an absorptive neutral density filter 370 as shown in FIG. 3. It can be see in FIG. 4 that there are no signs of fringing due to optical interference.

Accordingly, the embodiment of the present invention illustrated in FIG. 3 has the advantage of mitigating the ghost image to levels that cannot be detected by the pixelated detector. The absorptive neutral density filter also provides an additional optical attenuation of OD≤−1, which enables the pixelated detector to handle increased laser power by at least a factor of 10, in contrast to the current state of the art which is a windowless pixelated detector.

In an additional embodiment, instead of optically attaching the absorptive neutral density filter 370 to the protective glass window 320, the protective window of the pixelated detector may be completely replaced by the absorptive neutral density filter 370. The absorptive neutral density filter 370 may be installed in place of the protective glass window 320 during the production process of the pixelated detector, thereby eliminating the additional step of bonding the absorptive neutral density filter 370 to the protective glass window 320. In this embodiment, the absorptive neutral density filter 370 would be positioned in close proximity to the pixelated detector 325. In a particular embodiment, the absorptive neutral density filter 370 would be positioned less than about 5 mm from the pixelated detector 525.

Figure 5:
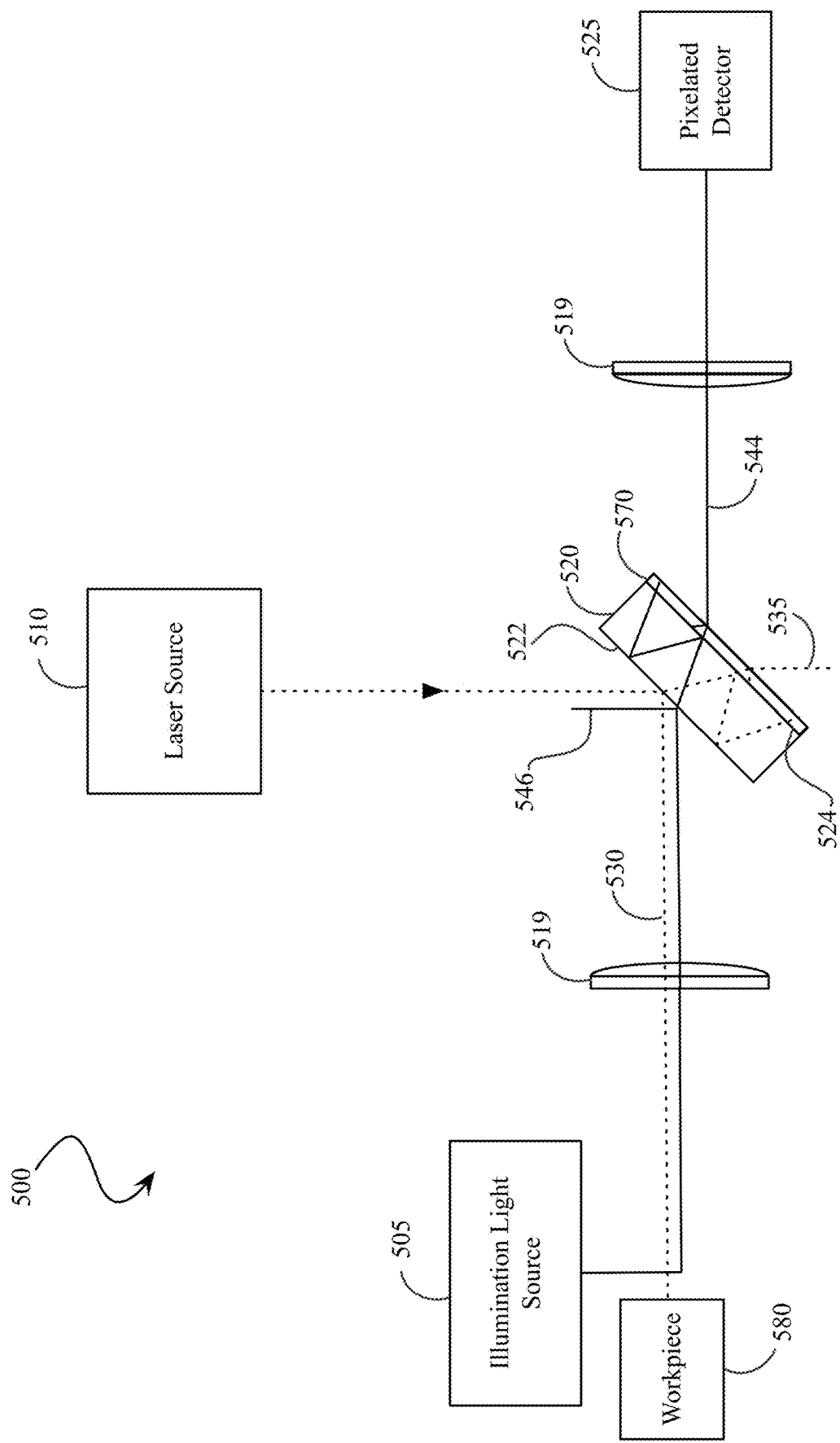
FIG. 5 illustrates a laser imaging system incorporating an absorptive neutral density filter optically connected to a laser bending mirror to reduce ghost images, in accordance with an embodiment of the present invention.

With reference to FIG. 5, in an additional embodiment of the present invention, ghost images may additionally be reduced in a laser imaging system 500, such as a laser used for material processing and a vision system that allows vision of the laser interaction area. In operation of this embodiment, a laser beam 515 from a laser source 510 is directed toward an optical element 520 having a mirror surface 522 that reflects the laser 530, while also transmitting visible light 535. As such, in this embodiment the optical element 520 may be referred to as a laser turning mirror because it redirects the laser 530 to the workpiece 580. In order to view the laser interaction area, a pixelated detector is included in the laser imaging system 500. In one embodiment, an illumination light 507 from an illumination light source 505 of the pixelated detector provides illumination light 507 for the material processing workpiece 580 that is subjected to the laser 530 from the laser source 510. Additional lens 519, 542 may be added to the laser imaging system 500 for focusing the laser light and the illumination light.

In an exemplary embodiment, a user of a laser machining system may be viewing the workpiece 580 being acted upon by the laser 530 in the material processing system by illuminating the workpiece with a light source 507. Commonly, the illumination light 507 from the pixelated detector 505 is white light or light. In this embodiment, due to the turning of the laser 515 by the turning mirror 520, the transmitted light 535 from the optical element 530 does not produce ghost images at the detector 525, however, the illumination light 507 from the illumination light source 505 may produce detectable ghost images.

In this embodiment, the illumination light 507 strikes the turning mirror 520, wherein some of the illumination light 546 is reflected off of the mirror surface and some of the illumination light 544 is transmitted through the turning mirror. Typically, the second surface 524 of a laser turning mirror 520 is uncoated, which would result in a ghost Fresnel reflection of the incident illumination light 507, due to the glass-air interface. While it is known that coating the second surface 524 of the laser tuning mirror 520 with an anti-reflective coating is relatively effective in reducing ghost images, the remaining ghost images may still be within the detection range of the pixelated detector 525.

In the present invention, an absorptive neutral density filter 570 is positioned to optically contact the surface of the laser tuning mirror 520 closest to the pixelated detector 525. As previously described, the absorptive neutral density filter 570 has a OD≤−1, thereby eliminating the need for an anti-reflective coating while also greatly reducing the ghost image incident upon the pixelated detector 525.

In general, as shown in the embodiment of FIG. 5, the addition of the absorptive neutral density filter 570 to the laser imaging system 500 greatly reduces the ghost images seen by the pixelated detector 525 resulting from the illumination light 507 from the pixelated detector, thereby improving the accuracy of the measurements taken by the pixelated detector 525.

Figure 6:
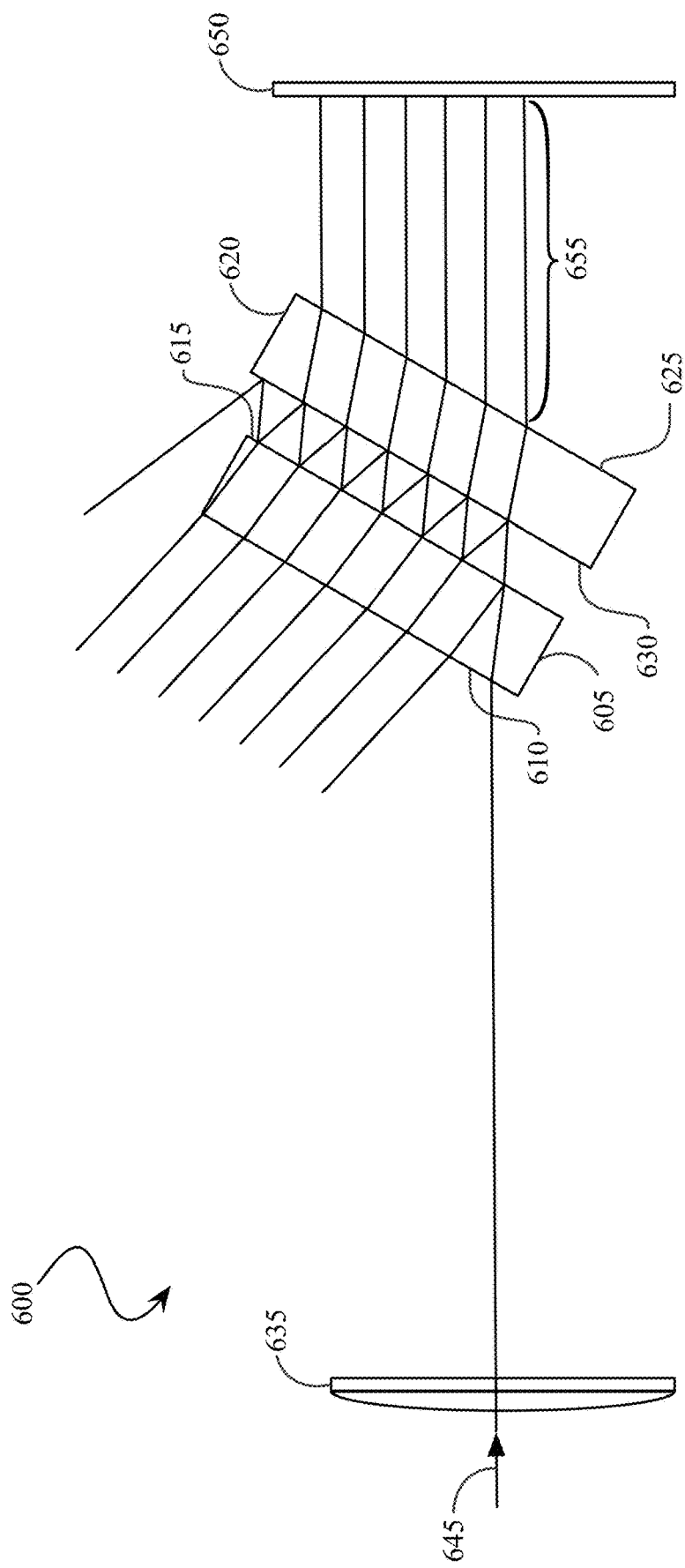
FIG. 6 illustrates a laser imaging system incorporating an absorptive neutral density filter into a Fabry-Perot cavity to reduce ghost images, in accordance with an embodiment of the present invention.

As shown with reference to FIG. 6, a laser imaging system 600 may include a pair of optical elements which are considered to be highly reflective mirrors 605, 620. The first mirror 605 is fabricated of highly transmissive glass suitable for the wavelength of the laser 645, such as fused silica ($SiO_2$), which has a high transmission from the ultraviolet through the near infrared region of the spectrum. The second mirror 620 is fabricated of an absorptive glass material, again suitable for the wavelength of the laser 645, such as an absorptive neutral density filter material. The first mirror 605 has a highly reflective surface 615 and an anti-reflective coated surface 610 and the second mirror 620 has a highly reflective surface 630 and an anti-reflective coated surface 625. The second mirror having an absorptive substrate, a highly reflective surface 630 and an anti-reflective coated surface 625 is considered in this embodiment to be an absorptive neutral density filter 620. In a particular embodiment, the highly reflective surfaces 615, 630 may be between about 98% and 99.9% reflective to the laser 645.

The first mirror 605, and the absorptive neutral density filter 620 are positioned downstream from a focusing lens 635 for focusing received laser beam 645. The first mirror 605, and the absorptive neutral density filter 620 have respective highly reflective surfaces 615, 630 facing each other, as shown in FIG. 6. The spacing between the mirrors 605, 620 is adjustable from a few microns to more than ten millimeters (10 mm).

In the embodiment of FIG. 6, the absorptive neutral density filter 620 may be further adjustable by a vertical and horizontal adjusting mount to align the first mirror 605, and the absorptive neutral density filter 620 so they are parallel to one another, thereby forming a Fabry-Perot resonator arrangement. In operation, the laser beam 645 is subjected to multiple reflections and associated splitting of the laser beam 645 within the Fabry-Perot resonator arrangement. As such, each subsequently transmitted beam 655 that is incident upon the pixelated detector 650 is about less than 1% less in intensity. If a nominally one watt of attenuated power from the laser 645 is focused by a lens 635 to be incident upon the first mirror 605 by passing first through the anti-reflective coated surface 610 and then, more than ninety nine percent (99%) of the laser light is reflected off the highly reflective surface 630 of the absorptive neutral density filter 620, and may be sent onto a simple beam dump (not shown). As such, the highly reflective surface 630 of the absorptive neutral density filter 620 is greater than 99% reflective and the anti-reflective coated surface 625 of the absorptive neutral density filter 620 is less than 0.5% reflective. Accordingly, as previously described, the absorptive neutral density filter 620 absorbs the light reflected back from the air-glass interface between the absorptive neutral density filter 620 and the pixelated detector 650, thereby reducing the ghost image seen by the pixelated detector.

In general, in the embodiment of FIG. 6, the absorptive neutral density filter 620 is effective in substantially reducing the ghost images seen by the pixelated detector. Additionally, the position of the absorptive neutral density filter 620 in the laser imaging system 600 can eliminate the need to place an absorptive filter between the optical elements 605, 620 and the pixelated detector, as is commonly known in the art.

Figure 7:
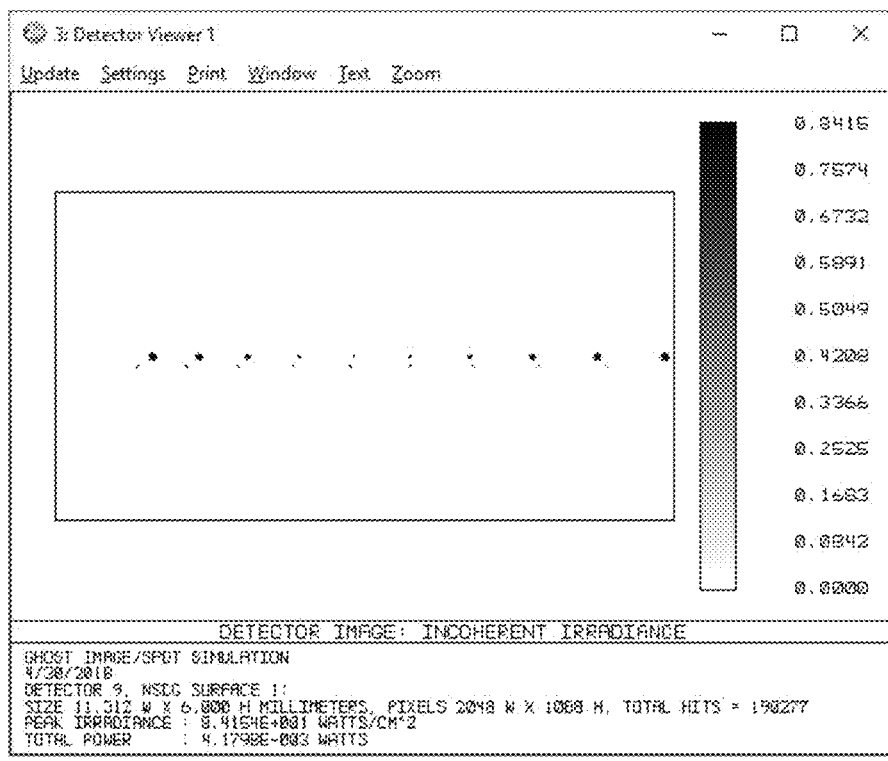
FIG. 7 illustrates the ghost images seen at a detector, as is known in the prior art.
Figure 8:
FIG. 8 is a zoomed view of FIG. 7.

FIG. 7 illustrates the basic phenomenon of a second surface ghost image or spot occurring at a pixelated detector as is known in the prior art. FIG. 8 is a zoomed image of FIG. 7, more clearly illustrating the transmitted beam and the ghost images present in the prior art.

Figure 9:
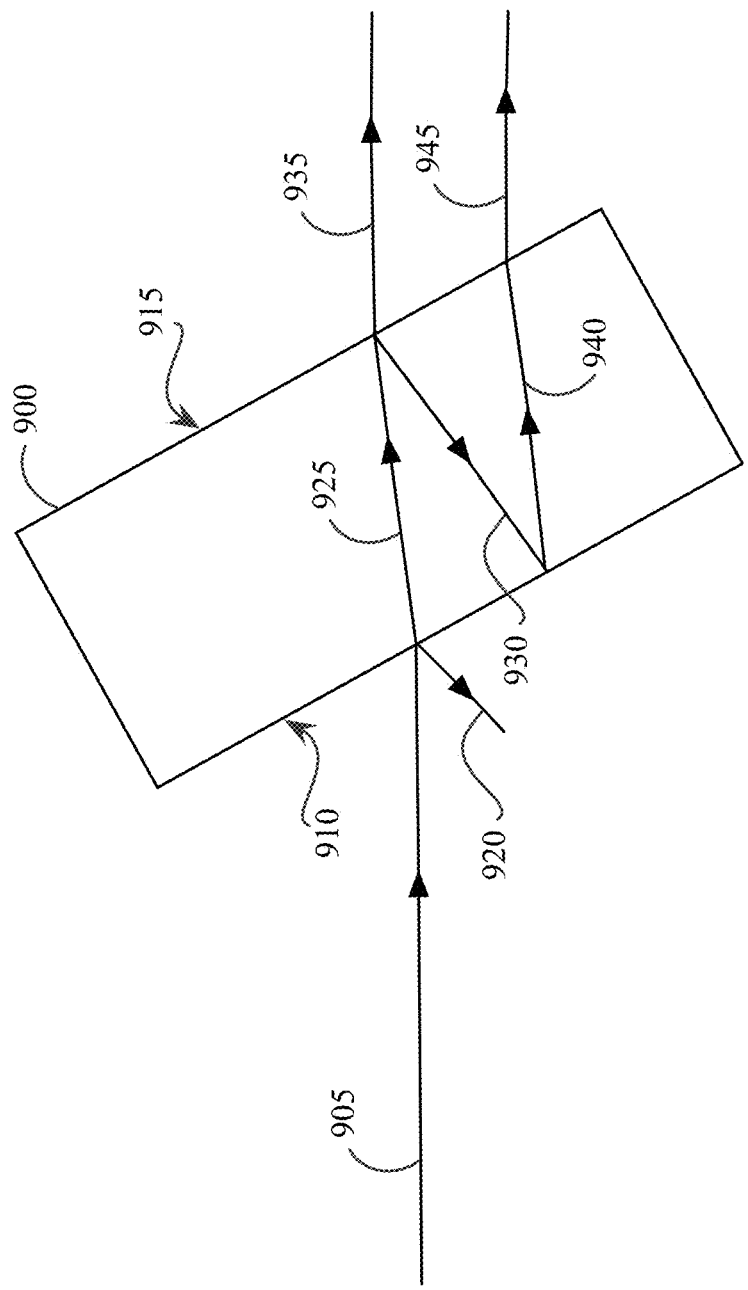
FIG. 9 illustrates a second surface reflection at an optical element producing ghost images of a transmitted laser beam at a detector, as is known in the prior art.

FIG. 9 illustrates how the ghost image is formed through an optical element 900 that is serving as both a reflective and transmissive optical element 900. In one embodiment, the optical element may be a substantially transmissive glass, such as $SiO_2$. In operation, a laser beam incident upon a first surface 910 of the optical element 900, enters the optical element 900 and, depending upon the specific coatings on the first surface 910 and the second surface 915, a portion of the light from the laser 905 is reflected 920 from the first surface 910 and a portion of the light from the laser 905 is transmitted 925 through the glass. The transmitted light 925 then impinges on the second surface 915, which is generally anti-reflection coated, such that typically less than 0.5% of the light is reflected back into the glass 930 and the remaining light passes through 935 and to be analyzed by the detector. This less than 0.5% of reflected light 930 then impinges again on the first surface 910 of the optical element 900 and is then reflected back 940 towards the second surface 910, thereby resulting in a ghost image 945 at the detector. It is this ghost image 945 that interferes with the measurement system at the detector.

Figure 10:
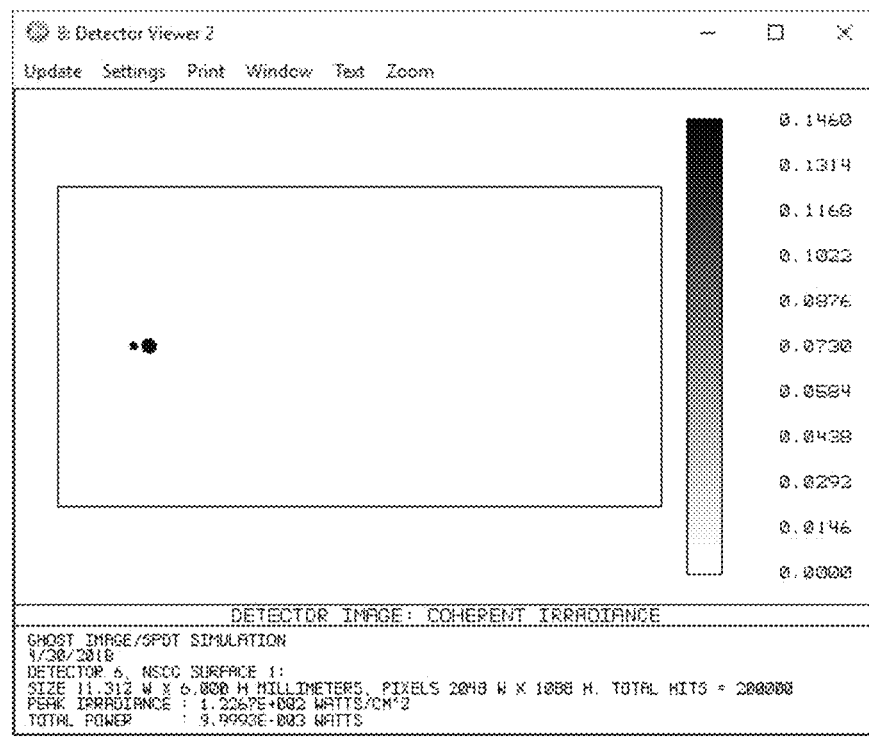
FIG. 10 illustrates the ghost images resulting from the reflections at the optical element of FIG. 9.
Figure 11:
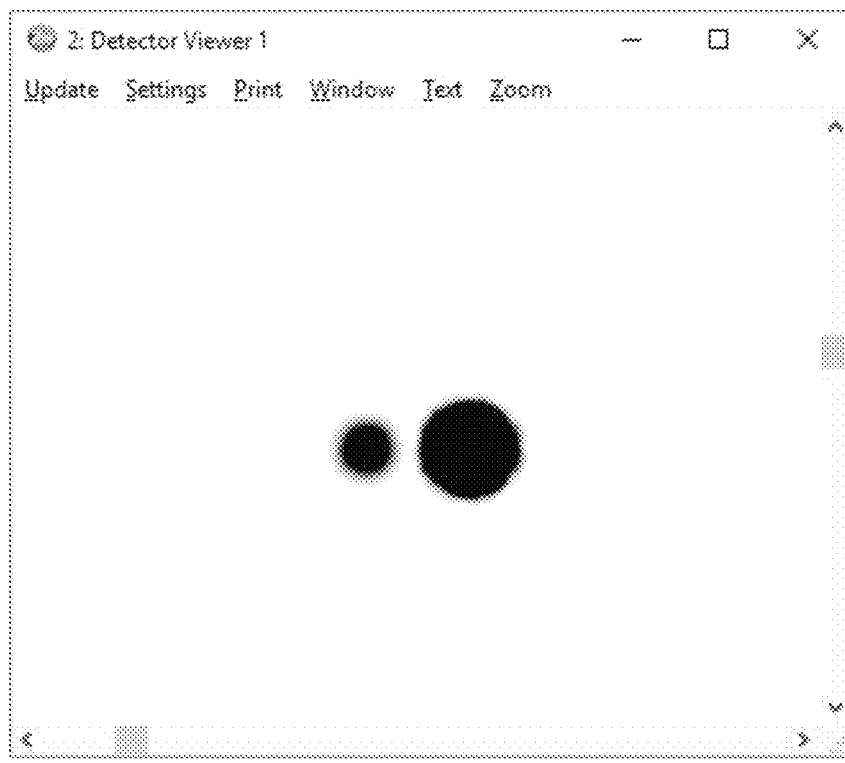
FIG. 11 is a zoomed view of FIG. 10.

FIG. 10 illustrates a detector simulation of the ghost image, showing the transmitted beam and the second surface ghost image that would occur utilizing the optical element 900 shown in FIG. 9 in a laser imaging system. FIG. 11 illustrates a zoomed view of the two beams of FIG. 10, including the desired transmitted beam and the undesired ghost image.

Figure 12:
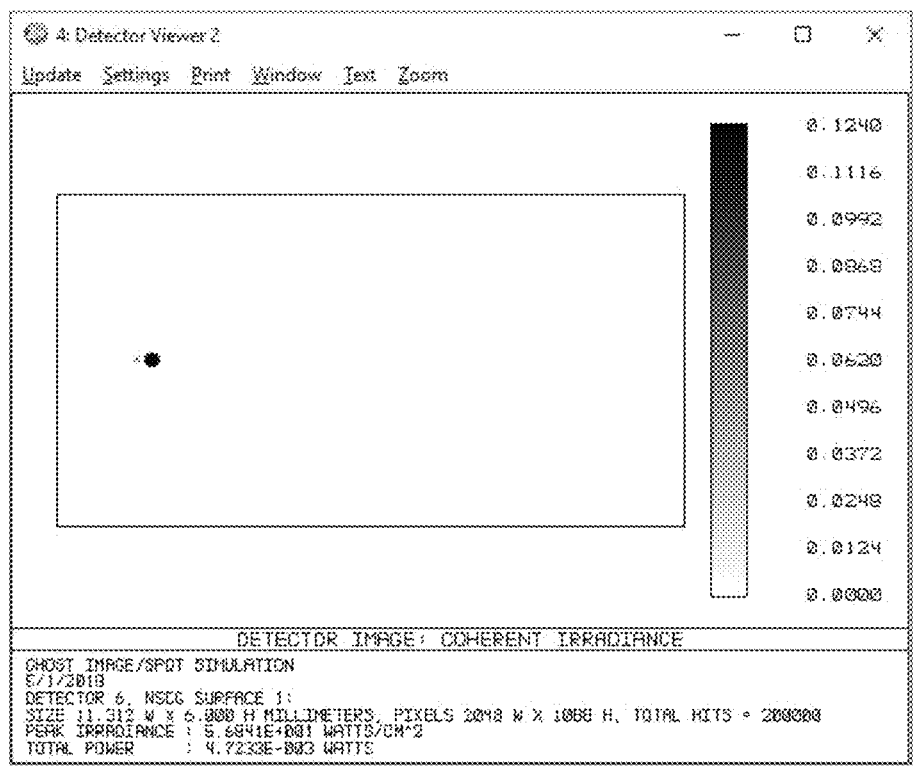
FIG. 12 illustrates the reduced ghost images observed when incorporating the absorptive neutral density filter into the laser imaging system, in accordance with an embodiment of the present invention.
Figure 13:
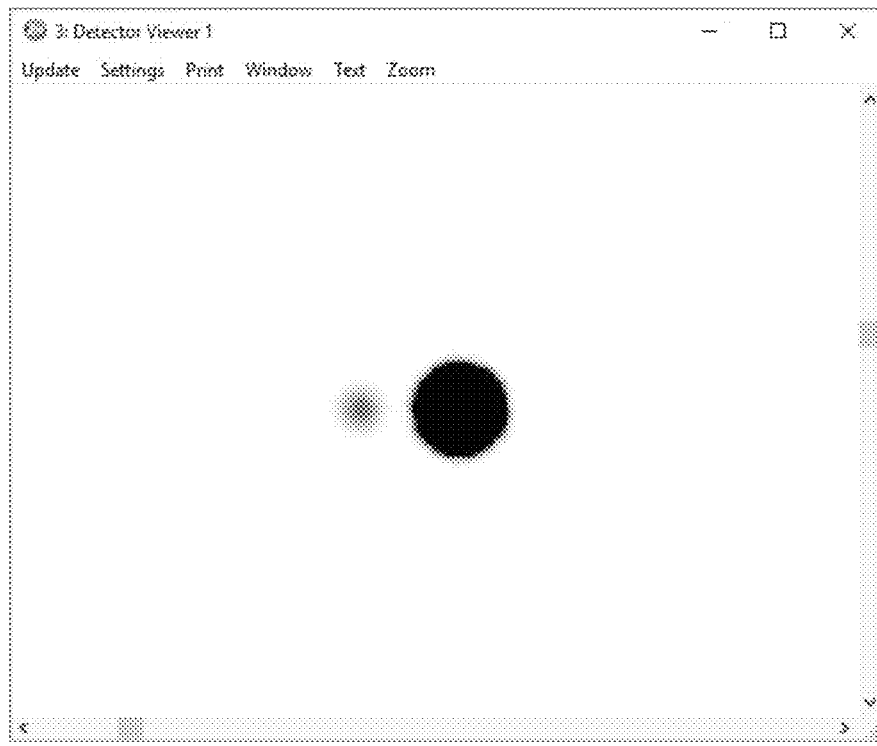
FIG. 13 is a zoomed view of FIG. 12.

FIG. 12 illustrates a detector simulation wherein the $SiO_2$ glass of the optical element 900 of FIG. 9 is replaced by Schott® NG11 absorbing filter glass, in accordance with the embodiments of the present invention. FIG. 13 illustrates a zoomed view of the resulting transmitted beam and ghost image of FIG. 12. As can be seen in FIG. 13, the embodiments of the present invention are effective in greatly reducing the ghost image at the detector. The simulation shown a greater than 10 times reduction in the ghost image intensity. As such, utilizing NG11 glass in the optical element 900, even with a similar anti-reflection coating on the second surface, the net second surface reflection would be reduced from less than 0.5% to less than 0.05%. Such a reduction in the ghost image intensity would not be noticeably detected by the pixelated detector, in contrast to the transmitted beam, and would fall within the noise of the pixelated detector, thereby improving the ability of the pixelated detector to accurately analyze the laser beam.

Figure 14:
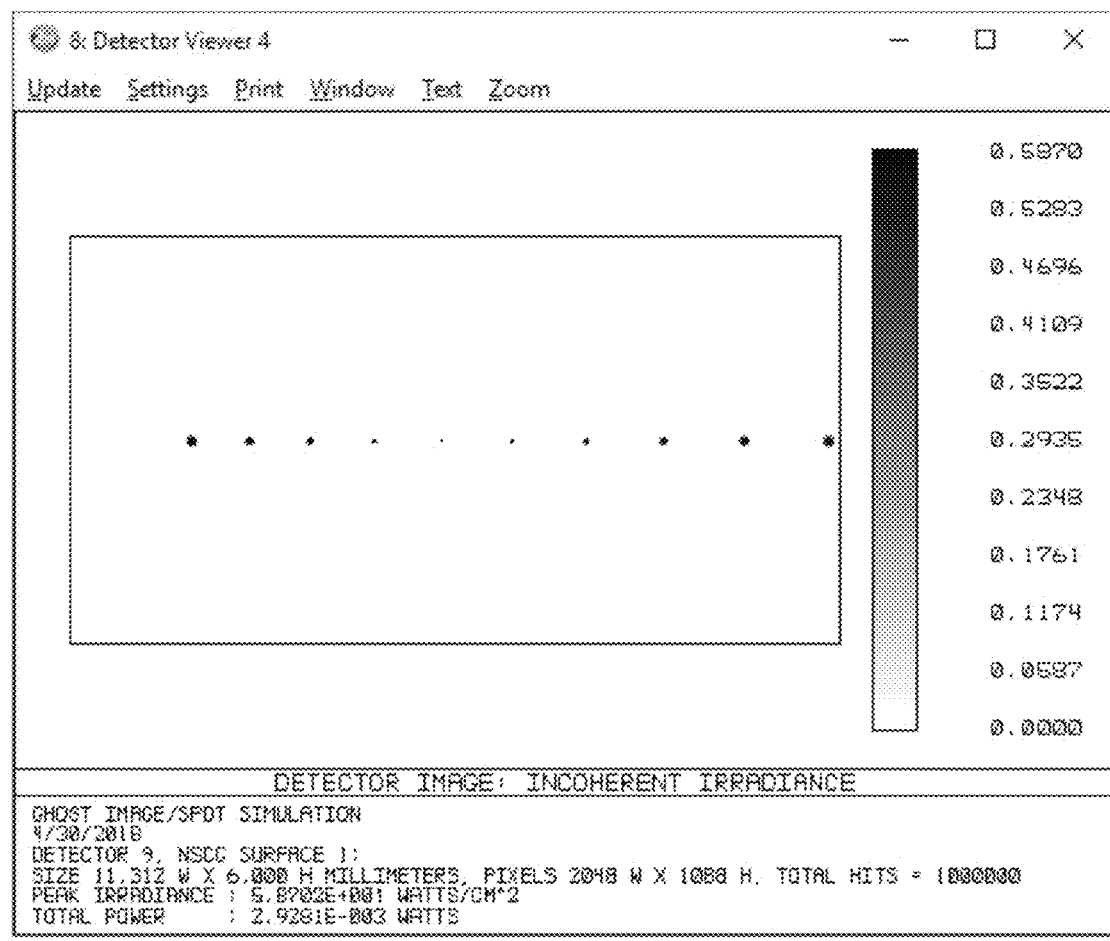
FIG. 14 illustrates the reduction in the ghost image resulting from the laser imaging system shown in FIG. 6, in accordance with an embodiment of the present invention.

FIG. 14 illustrates the resulting images seen by the detector with reference to the embodiment in FIG. 6, wherein the optical element 620 is a Schott® NG11 absorptive neutral density filter. As can be seen in FIG. 14, the ghost image is suppressed for the given exposure time of the detector. Additionally, utilizing a more absorbing filter such as Schott® NG1, NG4, NG5, NG9, or any other absorbing filters known in the art, would increase this ratio, while at the same time reducing the intensity of the transmitted beam to be measured, without requiring that a second absorbing filter be placed in front of the detector.

Accordingly, in various embodiments the present invention provides an improved laser imaging system that is effective in reducing ghost images seen by the detector of the imaging system, thereby improving the ability of the detector to accurately analyze an incident laser.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for reducing ghost images in a laser imaging system, the method comprising:
    positioning an absorptive neutral density filter between a pixelated detector and a laser source, wherein the absorptive neutral density filter has a first surface facing the laser source and a second surface facing, and in close proximity to, the pixelated detector, and wherein the absorptive neutral density filter attenuates incident radiation from the laser source uniformly independent of wavelength, and wherein the second surface further comprises an anti-reflective coating and the first surface is a highly reflective surface;

emitting a laser beam, from the laser source, onto the first surface of the absorptive neutral density filter;

transmitting a portion of the light incident upon the first surface of the absorptive neutral density filter to the second surface of the absorptive neutral density filter;

reflecting a portion of light incident upon the second surface of the absorptive neutral density filter; and absorbing the reflected portion of light, by the absorptive neutral density filter, to reduce ghost images at the pixelated detector.

2. The method of claim 1, wherein the absorptive neutral density filter is an absorbing glass having an optical density (OD) of at least −1.

3. The method of claim 1, wherein the highly reflective first surface of the absorptive neutral density filter is a highly reflective coating.

4. The method of claim 1, wherein the absorptive neutral density filter further comprises an optical element in optical contact with the neutral density filter and positioned between the second surface of the absorptive neutral density filter and the anti-reflective coating.

5. The method of claim 1, wherein the absorptive neutral density filter further comprises an optical element in optical contact with the first surface of the absorptive neutral density filter.

6. The method of claim 4, wherein the absorptive neutral density filter is bonded to the optical element using a bonding agent having an index of refraction substantially equal to the index of refraction of the absorptive neutral density filter and the optical element.

7. The method of claim 4, wherein the absorptive neutral density filter is bonded to the optical element by establishing atomic bonding between the absorptive neutral density filter and the optical element.

8. The method of claim 5, wherein the absorptive neutral density filter is bonded to the optical element using a bonding agent having an index of refraction substantially equal to the index of refraction of the absorptive neutral density filter and the optical element.

9. The method of claim 5, wherein the absorptive neutral density filter is bonded to the optical element by establishing atomic bonding between the absorptive neutral density filter and the optical element.

10. The method of claim 4, wherein the optical element is a protective glass window of the pixelated detector and a first surface of the protective glass window is positioned in optical contact with the second surface of the absorptive neutral density filter and a second surface of the protective glass window comprises the anti-reflective coating.

11. The method of claim 5, wherein the optical element is a mirror that reflects the laser beam but transmits visible light to the absorptive neutral density filter, and wherein the mirror is positioned in optical contact with the first surface of the absorptive neutral density filter.

12. An apparatus for reducing ghost images in a laser imaging system, the apparatus comprising:

a pixelated detector to analyze a laser beam emitted from a laser source;

an absorptive neutral density filter positioned between the pixelated detector and the laser source;

the absorptive neutral density filter having a first surface facing the laser source and a second surface facing, and in close proximity to, the pixelated detector, and wherein the absorptive neutral density filter attenuates incident radiation from the laser source uniformly independent of wavelength, and wherein the second surface comprises an anti-reflective coating and the first surface is a highly reflective surface; and the absorptive neutral density filter for receiving a laser beam emitted from the laser source, for transmitting a portion of light incident upon the first surface of the absorptive neutral density filter to the second surface of the absorptive neutral density filter, for reflecting a portion of light incident upon the second surface of the absorptive neutral density filter and for absorbing the reflected portion of light to reduce ghost images at the pixelated detector.

13. The apparatus of claim 12, wherein the absorptive neutral density filter comprises an absorptive glass substrate.

14. The apparatus of claim 12, wherein the first surface of the absorptive neutral density filter is greater than about 99% reflective and the second surface of the absorptive neutral density filter is less than about 0.5% reflective.

15. The apparatus of claim 12, wherein the laser beam emitted from the laser source is longitudinally and spatially coherent.

16. An apparatus for reducing ghost images in a laser imaging system, the apparatus comprising:

a pixelated detector to analyze a laser beam emitted from a laser source;

an absorptive neutral density filter comprising an optical element, the absorptive neutral density filter and the optical element positioned between the pixelated detector and the laser source;

the absorptive neutral density filter having a first surface facing the laser source and a second surface facing, and in close proximity to, the pixelated detector, and wherein the absorptive neutral density filter attenuates incident radiation from the laser source uniformly independent of wavelength, and wherein the second surface comprises an anti-reflective coating and the first surface is highly reflective; and the absorptive neutral density filter for receiving a laser beam emitted from the laser source, for transmitting a portion of light incident upon the first surface of the absorptive neutral density filter to the second surface of the absorptive neutral density filter, for reflecting a portion of light incident upon the second surface of the absorptive neutral density filter and for absorbing the reflected portion of light to reduce ghost images at the pixelated detector.

17. The apparatus of claim 16, wherein the optical element is positioned in optical contact with the first surface of the absorptive neutral density filter and wherein the optical element is a mirror that reflects the laser beam but transmits visible light to the absorptive neutral density filter.

18. The apparatus of claim 16, wherein the optical element is a protective window for the pixelated detector and wherein a first surface of the optical element is in optical contact with the second surface of the absorptive neutral density filter and wherein a second surface of the optical element comprises the anti-reflective coating.

19. The apparatus of claim 16, wherein the absorptive neutral density filter is bonded to the optical element.

20. The apparatus of claim 19, wherein the absorptive neutral density filter is bonded to the optical element using a bonding agent having an index of refraction substantially equal to the index of refraction of the absorptive neutral density filter and the optical element.

21. The apparatus of claim 19, wherein the absorptive neutral density filter is bonded to the optical element by establishing atomic bonding between the absorptive neutral density filter to the optical element.

22. The method of claim 1, wherein the optical element is a mirror that reflects the laser beam but transmits visible light to the absorptive neutral density filter, and wherein the mirror is spaced apart from the absorptive neutral density filter and in parallel alignment with the absorptive neutral density filter.

23. The apparatus of claim 19, wherein the optical element is a mirror that reflects the laser beam but transmits visible light to the absorptive neutral density filter, and wherein the mirror is spaced apart from the absorptive neutral density filter and in parallel alignment with the absorptive neutral density filter.

* * * * *